Aug. 6, 1929.  B. N. ROADENBAUGH  1,723,490
LOOSE GRAIN RECEIVER FOR BINDERS
Filed May 5, 1928  2 Sheets-Sheet 1
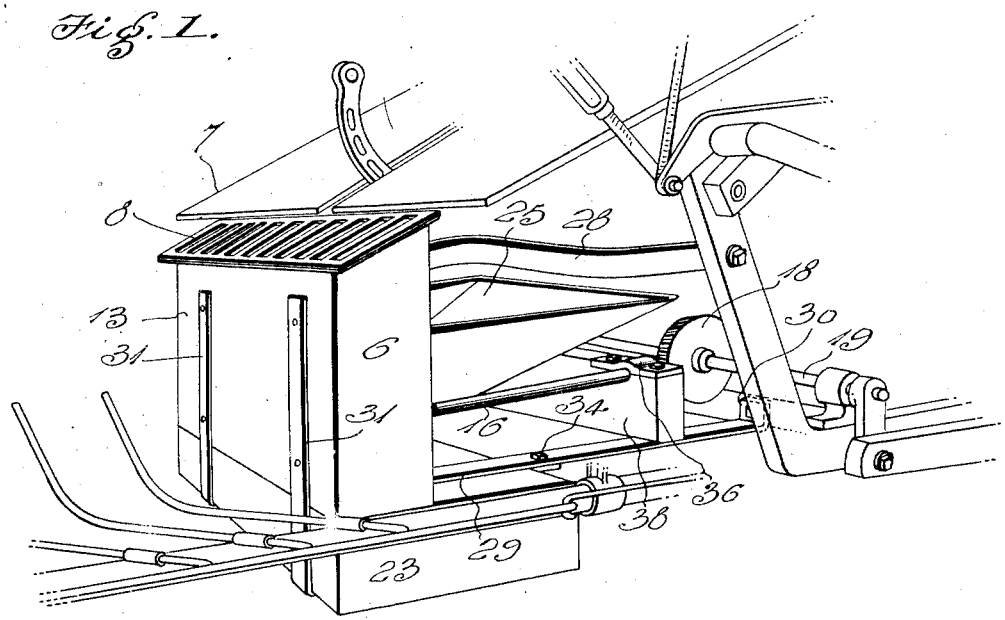
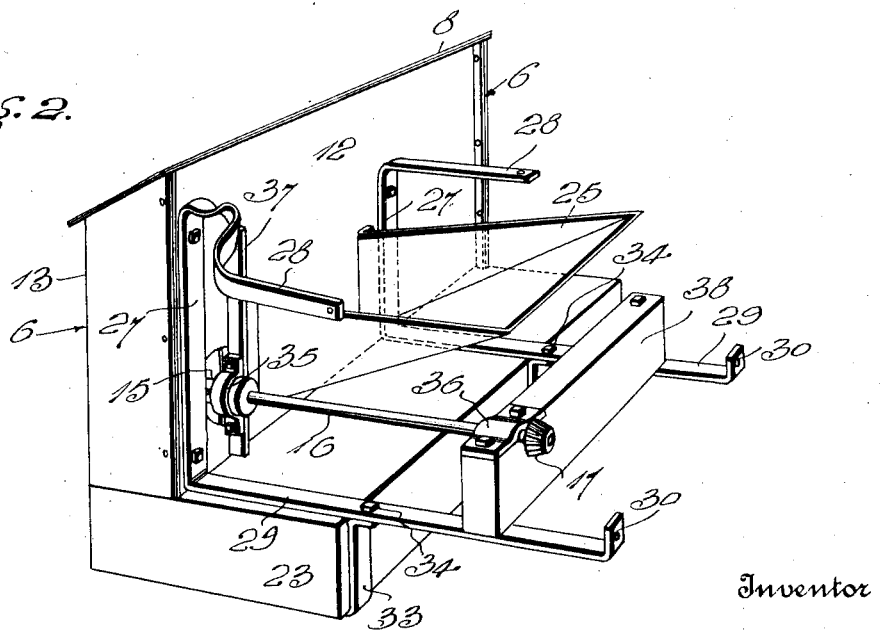
Witness
H. Woodard
Inventor
B. N. Roadenbaugh
By H. B. Wilson & Co.
Attorneys

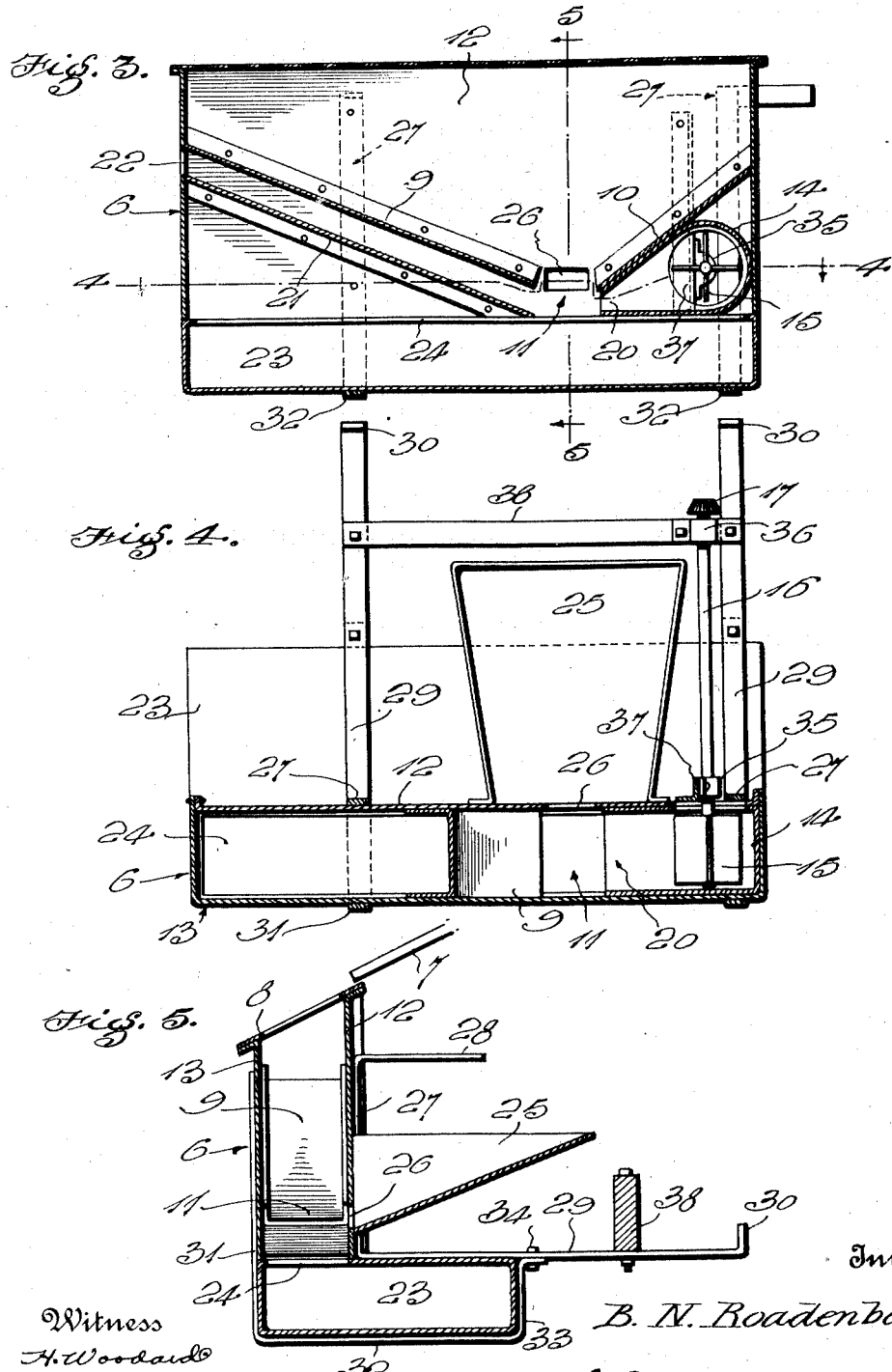

Patented Aug. 6, 1929.

1,723,490

UNITED STATES PATENT OFFICE.

BELTON N. ROADENBAUGH, OF NEWTON, KANSAS.

LOOSE-GRAIN RECEIVER FOR BINDERS.

Application filed May 5, 1928. Serial No. 275,419.

The invention relates to a novel device for receiving loose grain falling from the deck of a binder. Ordinarily, during the bundling operation, grain is shaken from the husks and falls from the deck onto the ground, being thus not only lost, but later causing volunteer grain which is a nest for all kinds of insects and flies. Due to the nature of the present invention however, all of this loose grain is caught and saved at the time it falls from the deck.

It is one object of the invention to provide a rather simple and inexpensive, yet an efficient attachment for a binder, which will not only catch the loose grain from the lower end of the deck, but will also catch any grain falling through openings in said deck, which openings are necessary due to movable parts of the binding mechanism, provision being made whereby the grain falling from the lower end of the deck and that falling through the deck, is conveyed into a common receiver.

Another object is to provide unique means whereby all chaff and the like is blown from the grain on its way to the grain receptacle.

A still further object is to provide a novel construction and arrangement of parts whereby the grain receptacle is removably supported in such a manner that it may be entirely withdrawn for dumping of its contents from time to time.

With the foregoing in view, the invention resides in the novel subject matter hereinafter described and claimed, description being accomplished by reference to the accompanying drawings.

Fig. 1 is a perspective view showing the attachment secured upon a binder.

Fig. 2 is a perspective view of the attachment removed from the binder.

Fig. 3 is a longitudinal sectional view through the attachment.

Fig. 4 is a top plan view partly in horizontal section on line 4—4 of Fig. 3.

Fig. 5 is a vertical transverse section on the correspondingly numbered line of Fig. 3.

The drawings above briefly described, illustrate the preferred form of construction and while this construction will be herein specifically explained, it is to be understood that within the scope of the invention as claimed, variations may be made.

The numeral 6 designates a flat-sided hopper positioned to receive falling grain at the lower end of a binder deck 7, the open upper end of said hopper being preferably provided with an appropriate screen 8 which prevents any stalks of grain from falling into said hopper. The bottom of the hopper is formed by two downwardly converging sections 9—10 which are spaced apart at their lower ends to provide a restricted grain outlet 11, and it will be seen from the drawings, that the inner side wall 12 of the hopper and the outer side wall 13 thereof, both project downwardly below said bottom-forming sections 9—10. Mounted between these side walls 12—13, under the bottom section 10, is a blower housing 14 containing a blower fan 15, the shaft 16 of this fan being provided with a bevel pinion 17 meshing with a bevel gear 18 on the pitman shaft 19 of the binder. The outlet 20 of the blower casing 14 is positioned to direct a blast of air through the grain descending from the hopper outlet 11. Under the bottom section 9, is an inclined plate 21 co-operating with said bottom section in forming a discharge passage for the air from the blower, a slot 22 being formed in one end of the hopper at the delivery end of said passage. The blast of air passing through the grain from the outlet 11, cleans it of all dust, chaff and the like, and the cleaned grain descends into a rectangular receptacle 23. This receptacle is rather flat to prevent possible dragging upon the ground and its top is preferably formed throughout its length, with a slot 24, through a portion of which the grain from the outlet 11 passes. This slot is also instrumental in dumping the contents of the receptacle 23, when the latter has been removed from its normal position beneath the hopper.

An auxiliary pan-like hopper 25 is secured to the inner side wall 12 of the hopper 6 and projects laterally therefrom to underlie slotted portions of the deck 7. The wall 12 of hopper 6 is formed with an opening 26 to which the bottom of the hopper 25 declines. This opening is disposed substantially at the hopper outlet 11 and it thus follows that all grain caught by the hopper 25, is discharged with the grain from the hopper 6 into the receptacle 23, all of this grain being cleaned by the blast of air from the blower.

A novel frame structure is provided for normally holding the hoppers and the receptacle 23 in operative relation. This same frame structure also constitutes means for attaching the entire device to the binder, and it is preferably constructed substantially as illustrated.

Two vertical bars 27 are secured against the outer sides of the inner wall 12 of the hopper 6, and have their upper ends 28 directed laterally from said hopper for attachment to the frame of the binder. The lower ends 29 of these bars are directed horizontally and project laterally away from the hopper side 12, the terminals 30 of said horizontal ends 29, being suitably shaped for securing to the binder frame.

Additional vertical bars 31 are secured against the outer sides of the hopper wall 13 and they project below the entire hopper 6. The lower ends 32 of the bars 31 are directed horizontally in downwardly spaced relation with the horizontal bar ends 29, and the terminals 33 of said bar ends 32 are bent upwardly and secured by fasteners 34 to said bar ends 29. The lowermost vertical portions of the bars 31, and the portions 32—33 of these bars, constitute yokes for supporting the receptacle 23, and said receptacle may be normally held in said yokes, either by friction or by any desired fastening means (not shown). Whenever the receptacle 23 is substantially full of grain, it may be outwardly slid from the yokes, readily dumped, and then again positioned in place for further use.

Any desired bearing means may be provided for the shaft 16. In the present showing, two bearings 35—36 have been illustrated, one carried by an angle metal bar 37 which is secured to the hopper wall 12, while the other is mounted upon a horizontal beam 38 which is secured upon the bar ends 29.

Excellent results have been obtained from the general construction shown and described. Such construction is therefore preferably followed, but within the scope of the invention as claimed, variations may be made.

I claim:—

1. In combination with a binder and a hopper positioned to receive loose grain falling from the deck of said binder, a receptacle beneath said hopper into which the grain from the hopper is discharged; a blower having an outlet positioned to direct a blast of air across the path on which the grain travels from the hopper to the receptacle, and driving means for said blower operatively connected with a driven part of the binder.

2. A loose grain receiving attachment for a binder, comprising a receptacle, a hopper to receive grain from the lower edge of the binder deck, said hopper having a restricted outlet discharging into said receptacle, an auxiliary pan-like hopper projecting laterally from the first named hopper to receive grain falling through the deck, said auxiliary hopper opening into the first named hopper substantially at said restricted outlet thereof, and a blower positioned to direct a blast of air through the grain passing from said outlet to said receptacle.

3. A loose grain receiving attachment for a binder, comprising a receptacle, a hopper to receive grain from the lower edge of the binder deck, said hopper having a restricted outlet discharging into said receptacle, and an auxiliary pan-like hopper projecting laterally from the first named hopper to receive grain falling through the deck, said auxiliary hopper opening into the first named hopper substantially at said restricted outlet thereof.

4. A loose grain receiving attachment for a binder, comprising a hopper to receive the grain, a receptacle into which said hopper discharges, and a frame structure holding said hopper and receptacle in operative relation and embodying supporting means upon which the receptacle rests slidably, permitting removal thereof for dumping.

5. A loose grain receiving attachment for a binder, comprising a flat-sided hopper to receive grain falling from the lower end of the binder deck, vertical bars secured to the inner side wall of said hopper and having horizontally directed lower ends projecting laterally from said inner side wall for attachment to the binder, additional vertical bars secured to the outer side wall of said hopper and having horizontally directed lower ends spaced below said horizontal ends of the first named bars, the terminals of the lower horizontal bar ends being directed upwardly and secured to said horizontal ends of the first named bars, and a receptacle under said hopper to receive grain therefrom, said receptacle resting on said lower horizontal bar ends.

6. A structure as specified in claim 5; the upper ends of said vertical bars being also directed laterally for anchorage to the binder.

In testimony whereof I have hereunto affixed my signature.

BELTON N. ROADENBAUGH.